US006376582B1

(12) United States Patent
Iwata et al.

(10) Patent No.: US 6,376,582 B1
(45) Date of Patent: Apr. 23, 2002

(54) WOOD FIBERBOARD AND MANUFACTURING METHOD THEREFOR

(75) Inventors: Ritsuo Iwata; Yoshihiro Hirano; Satoshi Suzuki, all of Hamamatsu; Katsunobu Fukuda; Hironori Watanabe, both of Osaka, all of (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/536,584

(22) Filed: Mar. 28, 2000

(30) Foreign Application Priority Data

Mar. 29, 1999 (JP) .......................................... 11-087248

(51) Int. Cl.[7] ............................ C08J 3/00; C08K 3/20; C08L 75/00; B32B 5/12; B32B 27/40

(52) U.S. Cl. .................... 524/14; 264/112; 264/331.19; 427/317; 427/325; 427/385.5; 427/393; 427/408; 427/440; 428/106; 428/107; 428/113; 428/425.1

(58) Field of Search ............................ 524/14; 264/112, 264/331.19; 427/317, 325, 385.5, 393, 408, 440; 428/106, 107, 113, 425.1

(56) References Cited

U.S. PATENT DOCUMENTS

| | | | | | |
|---|---|---|---|---|---|
| 4,592,962 | A | * | 6/1986 | Aoki et al. | 428/541 |
| 6,010,793 | A | * | 1/2000 | Yoshimura et al. | 428/537.1 |
| 6,129,871 | A | * | 10/2000 | Suzuki et al. | 264/51 |

* cited by examiner

*Primary Examiner*—Patrick D. Niland
(74) *Attorney, Agent, or Firm*—Ostrolenk, Faber, Gerb & Soffen, LLP

(57) ABSTRACT

The wood fiberboard of the present invention comprises wood fibers which have been subjected to an acetylation treatment and wood fibers which have not been subjected to an acetylation treatment bonded together by a binder resin, wherein the content of the wood fibers which have been subjected to an acetylation treatment is 35 to 90% by weight of the total amount of wood fibers which have been treated to an acetylation treatment and wood fibers which have not been subjected to an acetylation treatment.

6 Claims, 2 Drawing Sheets

WOOD FIBERBOARD AND MANUFACTURING METHOD THEREFOR

BACKGROUND OF THE INVENTION

1. Field of the Invention

The present invention relates to a wood fiberboard comprising wood fibers bound together with a binder resin. More specifically, the present invention relates to a wood fiberboard in which dimensional variation due to moisture is low, and from which the amount of formaldehyde discharge is low.

This application is based on patent application No. Hei 11-87248 filed in Japan, the content of which is incorporated herein by reference.

2. Description of the Related Art

Wood fiberboards, such as medium density fiberboard (hereinbelow referred to as MDF) comprising wood fibers bound together with binder resin, are superior in strength, have low anisotropy, and they are easily processed due to their homogeneity. These wood fiberboards can be used to obtain formed products which are not only flat in shape but which are also of curved shape, and they are widely used as materials, such as for furniture, and building materials.

In melamine type MDF, in which the wood fibers are bonded together by means of melamine resin, and MDI type MDF, in which the wood fibers are bonded together by means of MDI, the dimensional variations due to hygroscopicity and water absorption are great.

In addition, for 100% acetylated board in which the wood fibers (100% of which have been subjected to an acetylation treatment) are bonded together using MDI, the dimensional variation due to moisture is extremely small, and the formaldehyde discharge is in agreement with $E_0$, however, the acetylation treatment is expensive and the final cost of the wood fiberboard is high.

SUMMARY OF THE INVENTION

Therefore, an object of the present invention is the provision at low cost of a wood fiberboard for which the dimensional variation due to moisture is small, and the formaldehyde discharge is low.

The wood fiberboard of the present invention is a wood fiberboard in which wood fibers which have been subjected to an acetylation treatment and wood fibers which have not been subjected to an acetylation treatment are bonded together using a binder resin, and wherein the content of the wood fibers which have been subjected to an acetylation treatment is 35 to 90% by weight of the total amount of wood fibers which have been subjected to an acetylation treatment and wood fibers which have not been subjected to an acetylation treatment.

The manufacturing method of the present invention comprises conducting heat and pressure forming a mixture containing wood fibers which have been subjected to an acetylation treatment, wood fibers which have not been subjected to an acetylation treatment, and a binder resin, wherein the amount of wood fibers which have been subjected to an acetylation treatment is 35 to 90% by weight of the total amount of wood fibers which have been subjected to an acetylation treatment and the wood fibers which have not been subjected to an acetylation treatment.

The wood fiberboard of the present invention is superior in its balance of properties such as having good dimensional stability, the ability to sufficiently maintain strength such as modulus of rupture, a low amount of formaldehyde discharge, and in addition it is possible to keep costs low.

DETAILED DESCRIPTION OF THE INVENTION

Figure 1:
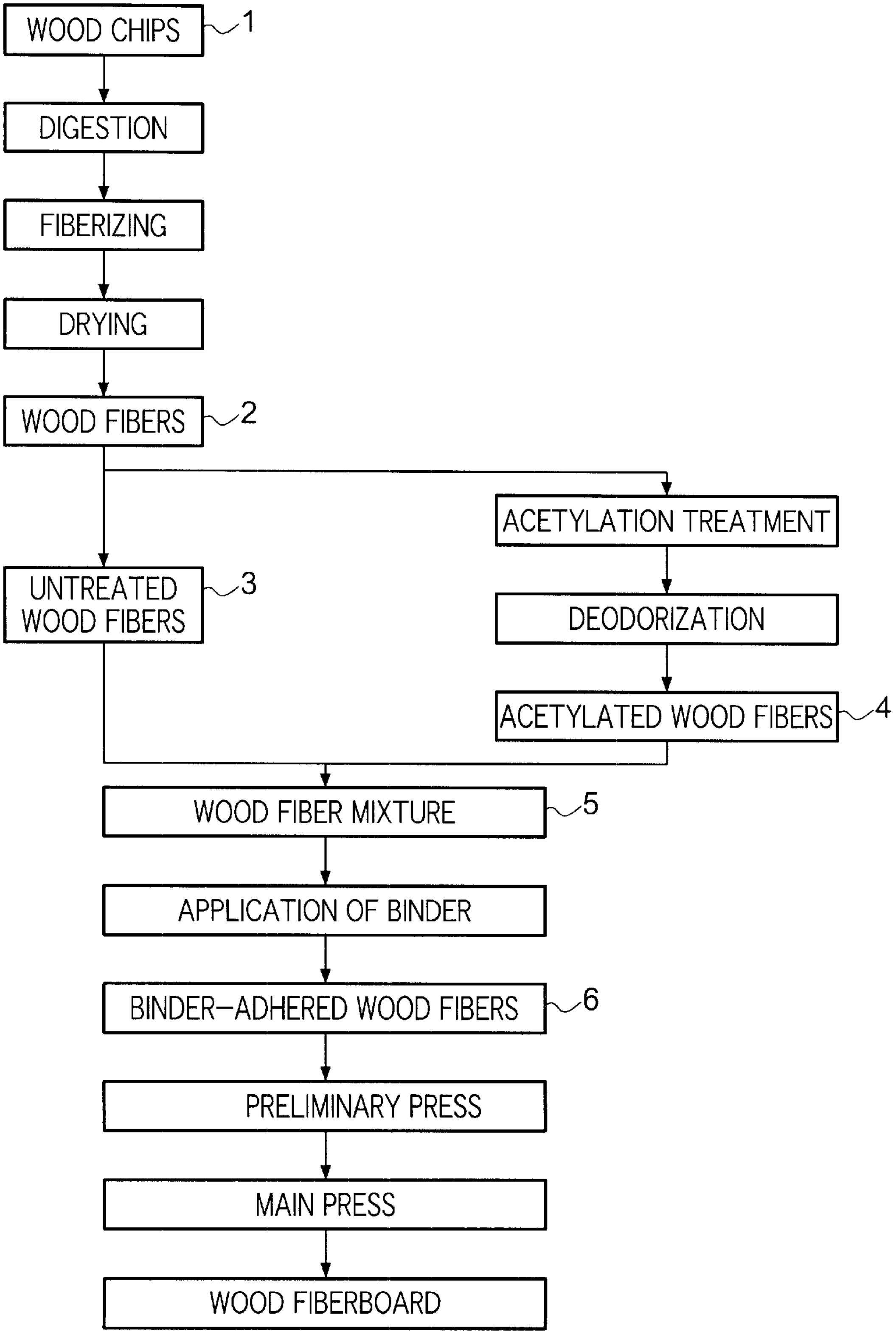
FIG. 1 is a diagram showing an example of the manufacturing method of the wood fiberboard of the present invention.

FIG. 1 is a process diagram showing an example of the manufacturing method for the wood fiberboard of the present invention.

As the wood fibers 2 for producing the wood fibers 4 which have been subjected to an acetylation treatment (hereinafter referred to as acetylated wood fibers) and the wood fibers 3 which have not been subjected to an acetylation treatment (hereinafter referred to as untreated wood fibers), for example, as shown in FIG. 1, wood is chipped using a chopper to make wood chips 1, and the obtained wood chips 1 are subjected to digestion using high pressure steam, then they are fiberized by means of a disk refiner, and dried.

The acetylated wood fibers 4 which are used in the manufacture of the wood fiberboard and the which are contained in the wood fiberboard are, for example, obtained by bringing wood fibers 2 which have not been subjected to an acetylation treatment into contact with the gaseous vapor of the acetylating agent in the vapor phase, and thereby replacing a portion of the hydroxyl groups (OH) within the wood fibers 2 with acetyl groups ($OCOCH_3$), as in the following formula.

$$[W]\text{—}OH+(CH_3CO)_2O \rightarrow [W]\text{—}OCOCH_3+CH_3COOH$$

Acetic anhydride can be suitably used as the above-mentioned acetylating agent.

In addition, the degree of acetylation of the acetylated wood fibers 4 is a weight percent gain of normally about 10 to 30% and preferably 12 to 20%. However, this may be suitably altered to meet the required water resistance and moisture resistance.

The acetylation treatment may be carried out in the vapor phase or in the liquid phase.

As a specific method for acetylation in the vapor phase, for example, there is a method in which the acetylating agent is filled into the bottom of a reactor vessel, a net made from stainless steel wire or the like is stretched thereabove, the wood fibers are placed on this net, and the acetylating agent is then heated to generate vapor of the acetylating agent so that the wood fibers and the vapor of the acetylating agent are brought into contact with each other. The reaction time is from around 15 minutes to 3 hours, and may be appropriately varied depending on the required degree of acetylation. Moreover, the reaction temperature is around 140~210° C. and the reaction pressure is at atmospheric pressure.

At the time of acetylation of the wood fibers, the acetylating agent such as acetic anhydride may be used diluted with an inactive solvent such as xylene which does not react with the acetylating agent. The amount of solvent used in this case is 70% by weight or less of the total weight of the acetylating agent and the solvent. By using this mixture of acetylating agent and solvent, the acetylation reaction which is an exothermic reaction can be made to proceed under moderate conditions, the reaction process is facilitated, and excessive acetylation or thermal degradation of the wood fibers can be suppressed.

In addition, it is preferable for the wood fibers 2 which are used in the acetylation to be dried in advance so that the moisture content is 3% by weight or less, and preferably 1% by weight or less. When the water content exceeds 3% by weight, the efficiency of the acetylation is reduced due to the acetic anhydride of the acetylation agent vapor reacting with the water first.

It is preferable for the content of the acetylated wood fibers 4 to be 35 to 90% by weight of the total amount of the acetylated wood fibers 4 and the untreated wood fibers 3. When this amount is less than 35% by weight, the wood fiberboard is inferior in resistance to moisture and water such that the water absorption thickness swelling coefficient, the linear expansion, and the like are large. When this amount exceeds 90% by weight, the wood fiberboard is inferior in its mechanical properties such that the modulus of rupture, modulus of elasticity, and the lie are low. When the amount is 35 to 90% by weight, it is possible to obtain a wood fiberboard which has a superior balance of qualities such as good dimensional stability, high strength, such as modulus of rupture, and with which it is possible to keep costs low.

As the binder resin used in the wood fiberboard of the present invention, for example, thermosetting adhesives such as melamine resins, phenol resins, urea resins, epoxy resins, and polyurethane resins; and foaming resins; or combinations of thereof can be used, however, polyurethane resins are preferable. Foaming resins are preferable from the standpoint that they can be applied uniformly to the wood fibers and thereby can bring about improved strength.

This type of foaming resin may comprise a resin which is self-foaming or it may comprise a non-foaming resin and a foaming agent.

As the above-mentioned self-foaming resin, for example, foaming polyurethane resins can be mentioned, and specifically, polymeric MDI (sometimes called crude MDI (methylene diphenyl diisocyanate), and hereinafter referred to as PMDI), in other words, a polymer of 4,4'-diphenylmethane diisocyanate, can be mentioned. PMDI reacts with the water, and the like, in the wood fibers and gives polyurethane resin.

As the above-mentioned non-foaming resin, for example, polystyrene resin (PS), epoxy resin (EP), polyvinyl chloride resin (PVC), phenol resin (PF), urea resin (UF), melamine-urea resin (MUF), mixtures thereof, and the like can be mentioned.

As the foaming agent, for example, volatile foaming agents such as $CCI_3F$, $CCI_2F_2$, and $CCl_2F\text{-}CCIF_2$; and thermally decomposing foaming agents such as azodicarbonamide, azohexahydrobenzonitrile, 2,2'-azoisobutyronitrile, benzene sulfohydrazide, and N,N'-dinitroso-N,N'-dimethyl terephthalamide; and the like can be mentioned.

The amount of the above-mentioned binder resin is not particularly limited. However, when the binder resin is polyurethane resin, the polyurethane resin is made to be 3 to 30% by weight, and preferably 8 to 20% by weight, with respect to the total amount of acetylated wood fibers and untreated wood fibers. When the binder resin is less than 3% by weight, the adhesion of the wood fibers is insufficient, and when the binder resin exceeds 30% by weight, there is an excess of binder resin and this is uneconomic.

In accordance with necessity, curing agents, curing catalysts, curing promoters, diluents, thickeners, adhesives, dispersants, and water repelling agents can be added to the above-mentioned binder resin.

The density of the wood fiberboard is determined in accordance with the use, and the like, of the wood fiberboard, and is not particularly limited, but is for example 0.50 to 0.90 g/cm$^3$.

An example of the manufacturing method of the wood fiberboard of the present invention is explained based on FIG. 1. In the method, the acetylated wood fibers 4 and the untreated wood fibers 3 are mixed such that the acetylated wood fibers 4 are 35 to 90% by weight of the total amount of acetylated wood fibers 4 and untreated wood fibers 3; binder-adhered wood fibers 6 are obtained by adhering the acetylated wood fibers 4 and the untreated wood fibers 3 with a non-cured binder resin in a liquid form, these binder-adhered wood fibers 6 are positioned between the heat platens of a thermal presser and subjected to heat and pressure forming in which the above-mentioned non-cured binder resin is cured and the acetylated wood fibers 4 and the untreated wood fibers 3 are bonded together by means of the binder resin.

The shapes of the acetylated wood fibers 4 and the untreated wood fibers 3 are not particularly limited, but, for example, the thickness is about 0.1 to 1.0 mm, and the length is about 0.2 to 50 mm, and a length of about 0.2 to 5 mm is preferable.

In the following, an example of the manufacturing method of the wood fiberboard of the present invention is explained in more detail based on FIG. 1. First, the acetylated wood fibers 4 are prepared by carrying out an acetylation treatment on the wood fibers 2, and then removing the acetylating agent. In addition, the untreated wood fibers 3 on which an acetylation treatment is not conducted are prepared. Then the acetylated wood fibers 4 (preferably having a moisture content of 5% by weight or less) and the untreated wood fibers 3 are mixed, to give a wood fiber mixture 5 in which the content of the acetylated wood fibers 4 with respect to the total amount of wood fibers 3 and 4 is 35 to 90% by weight, and the content of the untreated wood fibers 3 is 65 to 10% by weight with respect to the total number of wood fibers 3 and 4. Next, binder resin is applied to this wood fiber mixture 5 to make binder-adhered wood fibers 6.

It should be noted that in stead of applying the liquid binder resin at 20° C. to the wood fiber mixture 5 as shown in FIG. 1, it is possible to apply binder to acetylated wood fibers 4 and to apply binder to untreated wood fibers 3 separately and then mix them to make the binder-adhered wood fiber resin 6.

As the method for applying the binder resin to the wood fibers to which binder has not been applied, for example, a method in which application is conducted by a spray technique can be mentioned. Specifically, a method can be used in which the wood fibers are placed inside a drum (a blender) which is rotated slowly, and the binder resin is spray applied inside the blender as the wood fibers drop naturally inside the rotating drum.

Next, the binder-adhered wood fibers 6 to which the binder resin has been applied are subject to heat and pressure forming, and are built up, and thereby a wood fiberboard is obtained. As the method for the heat and pressure forming, as shown in FIG. 1, pre-pressing at room temperature, followed by main pressing in which heat and pressure forming are conducted can be carried out. The temperature during this forming is determined according to the binder resin which is used and is not particularly limited. For example, it is 140~210° C. when PMDI is used. In addition, the forming pressure also is not particularly limited, for example, it is 15~30kgf/$cm^2$ (1.5~3.0 MPa). The time for the forming is, for example, approximately 5 to 30 seconds per 1 mm of forming thickness.

In order for fire retardants, coloring agents, insecticides, preservatives, fungicides, water repellants, sound absorbing materials, foam beads, fillers, reinforcing materials, and the like to be contained in the wood fiberboard, they can be added in advance to the wood fiber mixture 5 or to the binder resin.

An example of preferable wood fiberboard of the present invention is one in which wood fibers comprising acetylated wood fibers 4 and untreated wood fibers 3 are 85% by weight or greater of the total amount of the wood fiberboard, and preferably 90% by weight. When the above-mentioned wood fibers 3 and 4 are bonded by polyurethane resin, the content of the acetylated wood fibers 4 is 45 to 85% by weight of the total amount of the above-mentioned wood fibers 3 and 4. This type of wood fiberboard contains in specific proportions acetylated wood fibers 4 which are superior in water resistance and moisture resistance, and untreated wood fibers 3 which are superior in strength, therefore, dimensional variation due to moisture is small, the amount of formaldehyde discharge is small, and the mechanical properties such as modulus of rupture and the like are superior.

DESCRIPTION OF PREFERRED EMBODIMENTS

In the following, in order to make the present invention even easier to understand, embodiments will be explained. In the following Embodiments and Comparative Examples, except where otherwise indicated, "parts " and "%" indicate parts by weight and percentage by weight.

Embodiment 1

In the following way, a wood fiberboard is manufactured by means of the manufacturing process shown in FIG. 1.

Acetylated wood fibers 4 were produced by acetylating wood fibers 2 having a thickness of about 0.1 to 1.0 mm and a length of about 2 to 35 mm (product name: F-4-17; manufactured by Canadian Forest Products Ltd. of Canada) with acetic anhydride using a gaseous phase acetylation processor (manufactured by Sumitomo Chemical Engineering Co.), and then the un-reacted acetic anhydride was removed by suction. The degree of acetylation of the acetylated wood fibers 4 was a 17% weight percent gain (WPG) with respect to the wood fibers 2.

On the other hand, the above-mentioned wood fibers 2 were used as the untreated wood fibers 3 as they were.

As the binder resin, PMDI (product name: Sumidur 44V-20, manufactured by Sumitomo Bayer Urethane Co.) was prepared.

50 parts of the above-mentioned acetylated wood fibers 4 and 50 parts of the above-mentioned untreated wood fibers 3 were mixed and wood fiber mixture 5 was obtained. 15 parts of the above-mentioned binder resin were applied to the 100 parts of wood fiber mixture 5, and thereby binder-adhered wood fibers 6 were obtained.

Next, the binder-adhered wood fibers 6 were heat and pressure formed for 5 minutes at a pressure of 20 kgf/$cm^2$ (2.0 MPa) and a temperature of 195° C., to give a wood fiberboard 330 mm long, 330 mm wide, and 12 mm thick. In this wood fiberboard, the wood fibers were bonded by polyurethane resin, 100 parts (87%) of the 115 parts of the total amount of the wood fiberboard are wood fibers (absolute dry weight, herein below this is the same), and 50% of the total amount of wood fibers are acetylated wood fibers 4.

With regard to the obtained wood fiberboard, the density, modulus of rupture (hereinafter referred to as MOR) and the like were measured using the following test methods. The results are shown in Table 1. The density, etc., shown in Table 1 are as follows.

Mixing ratio for the acetylated wood fibers: indicates the percentage by weight of acetylated wood fibers 4 with respect to the total amount of acetylated wood fibers 4 and the untreated wood fibers 3.

Embodiment 2

Embodiment 2 is an example in which a wood fiberboard was manufactured in exactly the same way as in Embodiment 1 except that in place of the 100 parts of wood fiber mixture 5 used in Embodiment 1, 100 parts of a wood fiber mixture 5 obtained by mixing 75 parts of acetylated wood fibers 4 the same as those in Embodiment 1 and 25 parts of untreated wood fibers 3 the same as those in Embodiment 1 were used, and then the density, etc., were measured. The mixing ratio for the acetylated wood fibers 4 and the density, and the like, of the obtained wood fiberboard are shown together in Table 1.

Comparative Examples 1 to 3

In place of the 100 parts of the wood fiber mixture 5 used in Embodiment 1, 100 parts of untreated wood fibers 3 were used in Comparative Example 1, 100 parts of a mixture of 25 parts of acetylated wood fibers 4 and 75 parts of untreated wood fibers 3 were used in Comparative Example 2, and 100 parts of acetylated wood fibers 4 were used in Comparative Example 3. In other respects, these Comparative Examples were conducted in exactly the same way as in Embodiment 1 to manufacture wood fiberboards and then the density, etc., were measured. The mixing ratio for the acetylated wood fibers 4 together with the density, etc., of the obtained wood fiberboard are shown in Table 1. Note that the untreated wood fibers 3 and the acetylated wood fibers 4 used in these Comparative Examples are the same as those used in Embodiment 1.

TABLE 1

| Test Method | | Embodiment 1 | Embodiment 2 | Comparative Example 1 | Comparative Example 2 | Comparative Example 3 |
|---|---|---|---|---|---|---|
| | Mixing ratio for the acetylated wood fibers (% by weight) | 50 | 75 | 0 | 25 | 100 |
| JIS A5905 5.4 | Density (g/$cm^3$) | 0.79 | 0.76 | 0.77 | 0.79 | 0.85 |
| JIS A5905 5.7 | Modulus of Rupture MOR (MPa) | 44.51 | 40.61 | 56.08 | 43.78 | 41.89 |

TABLE 1-continued

| Test Method | | Embodiment 1 | Embodiment 2 | Comparative Example 1 | Comparative Example 2 | Comparative Example 3 |
|---|---|---|---|---|---|---|
| JIS A5905 5.16 | Modulus of Elasticity MOE (1000 MPa) | 4.08 | 3.76 | 5.01 | 3.96 | 3.86 |
| JIS A5905 5.10 | The water absorption thickness swelling coefficient TS20 | 7.5 | 5.0 | 12.9 | 10.1 | 2.7 |
| 35° C., 95% 7 days | The Linear Expansion LE (%) | 0.20 | 0.17 | 0.36 | 0.21 | 0.20 |
| JIS A5905 5.12 | Peel Strength IB (MPa) | 2.17 | 1.85 | 1.93 | 1.73 | 2.73 |
| JIS A5905 5.15 | Formaldehyde discharge amount (mg/l) | 0.12 | 0.16 | 0.35 | 0.20 | 0.03 |

Embodiments 3 and 4

Embodiment 3 is an example in which a wood fiberboard was manufactured in exactly the same way as in Embodiment 1 with the exception that 15 parts of a resin mixture in which MUF and PMDI were mixed were used in place of the 15 parts of PMDI used as the binder resin in Embodiment 1, and density, etc., were measured. Embodiment 4 is an example in which a wood fiberboard was manufacture in exactly the same way as in Embodiment 2 with the exception that 15 parts of a resin mixture in which MUF and PMDI were mixed were used in place of the 15 parts of PMDI used as the binder resin in Embodiment 2, and density, etc., were measured. The mixing ratio for the acetylated wood fibers 4 together with the density, etc., of the obtained wood fiberboards are shown in Table 2.

In addition, as the above-mentioned resin mixture, a mixture containing 33% of MUF and 67% of PMDI (the same PMDI used in Embodiment 1) was used. MUF is melamine-urea resin, and specifically Oga Resin MB-1205 (product name) manufactured by Oga Sinkou Co.was used

Comparative Example 4 to 6

Comparative Examples 4 to 6 are examples in which wood fiberboards were manufactured in exactly the same way as in Comparative Examples 1 to 3 with the exception that 15 parts of a resin mixture in which MUF and PMDI were mixed were used in place of the 15 parts of PMDI used as a binder resin in Comparative Examples 1 to 3, and then density, and the like, were measured. The mixing ratio for the acetylated wood fiers 4 together with the density, etc., of the obtained wood fiberboards are shown in Table 2. The above-mentioned resin mixture was the same as that used in Embodiments 3 and 4.

From Tables 1 and 2, the wood fiberboards of Embodiments 1 to 4 which have mixing ratios for the acetylated wood fibers 4 of 50% or 75% have lower water absorption thickness swelling coefficients TS20, and linear expansion (the rate of dimensional variation after being left for 7 days indoors at 35° C. and 95% humidity) LE when compared with the wood fiberboards of the Comparative Examples which have mixing ratios for the acetylated wood fibers 4 of 0% or 25%. In addition, they have higher modulus of rupture (MOR) and Young's modulus of modulus of elasticity (MOE) when compared with the wood fiberboards of the Comparative Examples which have mixing ratios for the acetylated wood fibers 4 of 100%, and it is clear that they are superior in mechanical strength. In other words, the wood fiberboards of the present invention are superior in their balance of properties.

In addition, it is clear from Tables 1 and 2 that when the mixing ratio for the acetylated wood fibers 4 is 50%, the linear expansion LE is reduced by approximately ½ when compared to Comparative Examples 1 and 4 which have mixing ratios for the acetylated wood fibers 4 of In addition, from a comparison of Tables 1 and 2, when a mixture of MUF and PMDI is used as the binder resin, the modulus of rupture (MOR) and the modulus of elasticity (MOE) are greater when compared with the cases in which PMDI was used.

Figure 2:
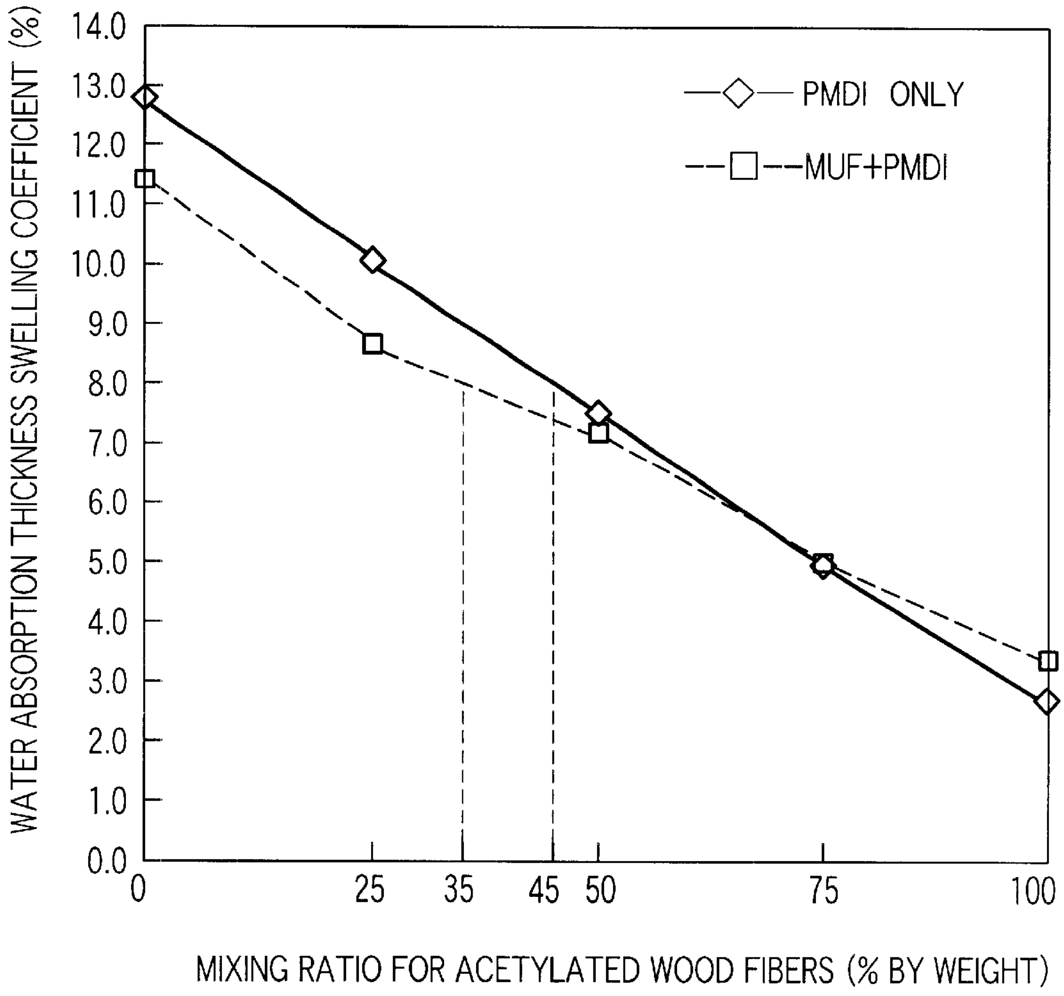
FIG. 2 is a graph showing the relationship of the mixing ratio for acetylated wood fibers and the water absorption thickness swelling coefficient for the Embodiments and the Comparative Examples.

FIG. 2 is a graph of the TS results of Tables 1 and 2, and shows the relationship between the mixing ratio for the acetylated wood fibers and the water absorption thickness swelling coefficient. From FIG. 2, it is clear that when PMDI was used as the binder resin, and when the mixing ratio for the acetylated wood fibers 4 was 45% or greater, the water absorption thickness swelling coefficient TS20 is 8% or less. In addition, it is clear that when the mixture of MUF and

TABLE 2

| Test Method | | Embodiment 3 | Embodiment 4 | Comparative Example 4 | Comparative Example 5 | Comparative Example 6 |
|---|---|---|---|---|---|---|
| | Mixing ratio for the acetylated wood fibers (% by weight) | 50 | 75 | 0 | 25 | 100 |
| JIS A5905 5.4 | Density (g/cm$^3$) | 0.81 | 0.82 | 0.82 | 0.81 | 0.77 |
| JIS A5905 5.7 | Modulus of Rupture MOR (MPa) | 51.32 | 47.71 | 50.90 | 53.30 | 45.35 |
| JIS A5905 5.16 | Modulus of Elasticity MOE (1000 MPa) | 4.53 | 4.36 | 4.69 | 4.71 | 3.94 |
| JIS A5905 5.10 | The water absorption thickness swelling coefficient TS20 | 7.2 | 5.1 | 11.4 | 8.8 | 3.2 |
| 35° C., 95% 7 days | The Linear Expansion LE (%) | 0.22 | 0.20 | 0.38 | 0.25 | 0.18 |
| JIS A5905 5.12 | Peel Strength IB (MPa) | 1.93 | 1.94 | 2.00 | 2.17 | 2.22 |
| JIS A5905 5.15 | Formaldehyde discharge amount (mg/l) | 0.30 | 0.25 | 0.10 | 0.15 | 0.05 |

PMDI was used as the binder resin, and when the mixing ratio for acetylated wood fibers 4 was 35% or greater, the water absorption thickness swelling coefficient TS20 is less than 8%.

Consequently, the wood fiberboards of the present invention can be widely used in materials for housing such as boards for housing, for example, materials for use around water, window frames, wall materials, and flooring materials for houses, and the like.

Although the invention has been descnbed in detail herein with reference to its preferred embodiments and certain described alternatives, it is to be understood that this description is by way of example only, and it is not to be construed in a limiting sense. It is further understood that numerous changes in the details of the embodiments of the invention, will be apparent to, and may be made by, persons of ordinary skill in the art having reference to this description. It is contemplated that all such changes and additional embodiments are within the spirit and true scope of the invention as claimed.

What is claimed is:

1. A wood fiberboard comprising wood fibers which have been subjected to an acetylation treatment and wood fibers which have not been subjected to an acetylation treatment bonded together by a binder resin, wherein the amount of said wood fibers which have been subjected to an acetylation treatment is 35 to 90% by weight of the total amount of wood fibers which have been subjected to an acetylation treatment and wood fibers which have not been subjected to an acetylation treatment.

2. A wood fiberboard according to claim 1, wherein said binder resin is a polyurethane resin.

3. A wood fiberboard according to claim 2, wherein the content of said polyurethane resin is 3 to 30% by weight with respect to the total amount of the wood fibers which have been subjected to an acetylation treatment and wood fibers which have not been subjected to an acetylation treatment.

4. A wood fiberboard according to claim 2, wherein said binder resin is a polyurethane resin formed by polymerizing polymeric MDI.

5. A wood fiberboard according to claim 4, wherein the content of said polyurethane resin is 3 to 30% by weight with respect to the total amount of the wood fibers which have been subjected to an acetylation treatment and wood fibers which have not been subjected to an acetylation treatment.

6. A manufacturing method for wood fiberboard comprising heat and pressure forming a mixture comprising wood fibers which have been subjected to an acetylation treatment and wood fibers which have not been subjected to an acetylation treatment and binder resin, wherein the amount of the wood fibers which have been subjected to an acetylation treatment is 35 to 90% by weight with respect to the total amount of wood fibers which have been subjected to an acetylation treatment and wood fibers which have not been treated to an acetylation treatment.

* * * * *